United States Patent
Takahashi et al.

[11] Patent Number: 6,104,449
[45] Date of Patent: Aug. 15, 2000

[54] LIQUID CRYSTAL DISPLAY DEVICE HAVING DTFTS CONNECTED TO A SHORT RING

[75] Inventors: Eiichi Takahashi, Matsuzaka; Yasunori Nishimura, Nara; Tadanori Hishida, Kashihara, all of Japan

[73] Assignee: Sharp Kabushiki Kaisha, Osaka, Japan

[21] Appl. No.: 09/190,711

[22] Filed: Nov. 12, 1998

[30] Foreign Application Priority Data

Nov. 14, 1997 [JP] Japan ................................ 9-313967

[51] Int. Cl.⁷ .................................................. G02F 3/1333
[52] U.S. Cl. ......................................................... 349/40
[58] Field of Search ............................... 349/40; 324/770; 257/355

[56] References Cited

U.S. PATENT DOCUMENTS

| | | | |
|---|---|---|---|
| 5,576,730 | 11/1996 | Shimada et al. | 324/770 |
| 5,798,534 | 8/1998 | Young | 257/59 |
| 5,973,658 | 10/1999 | Kim et al. | 349/40 |

FOREIGN PATENT DOCUMENTS

5-181157  7/1993  Japan .

*Primary Examiner*—Walter Malinowski
*Attorney, Agent, or Firm*—Dike, Bronstein, Roberts & Cushman, LLP; David G. Conlin; David A. Tucker

[57] ABSTRACT

A liquid crystal display device includes: an array substrate; a counter substrate facing the array substrate; and a liquid crystal layer interposed between the array substrate and the counter substrate, wherein the array substrate includes: a plurality of pixel electrodes arranged in a matrix in a display region; a plurality of gate lines; a plurality of source lines which cross the plurality of gate lines; an insulating layer provided between the plurality of gate lines and the plurality of source lines; a plurality of switching elements respectively connected to respective ones of the plurality of the gate lines, the plurality of source lines, and the plurality of pixel electrodes; and a short ring, a plurality of first inspection signal voltage input terminals and a plurality of depletion-type thin film transistors (DTFT) provided in a peripheral region adjacent the display region, and wherein each of the plurality of gate lines and the plurality of source lines is connected to the short ring via respective ones of the plurality of first inspection signal voltage input terminals and respective ones of the plurality of depletion-type thin film transistors, and the plurality of depletion-type thin film transistors is located between the short ring and the plurality of first inspection signal voltage input terminals, the plurality of depletion-type thin film transistors control electrical conduction between the short ring and the plurality of gate lines and source lines.

8 Claims, 8 Drawing Sheets

LIQUID CRYSTAL DISPLAY DEVICE HAVING DTFTS CONNECTED TO A SHORT RING

BACKGROUND OF THE INVENTION

1. Field of the Invention

The present invention relates to a liquid crystal display device used as display means of a computer or the like, and a method for inspecting the same.

2. Description of the Related Art

A liquid crystal display device includes a glass substrate and a counter glass substrate facing the glass substrate, and the glass substrate and the counter substrate are attached to each other with a liquid crystal material being introduced therebetween. By applying an electric signal between respective electrodes of the glass substrate and the counter electrode, incident light from an external light source is modulated, whereby information is displayed on the screen.

Such a liquid crystal display device has advantages over a CRT (cathode-ray tube) such as low power consumption, small thickness and light weight. Therefore, the liquid crystal display device has attracted attention as a next-generation display device, the production quantity thereof has been significantly increased. The liquid crystal display device includes a number of pixel electrodes which are arranged in a two-dimensional array. In order to improve the display quality of the liquid crystal display device, an active-matrix liquid crystal display device wherein switching elements such as thin film transistors (TFTs) are provided for the pixel electrodes have been increasingly produced.

However, due to the complex production process of the switching elements, a defective display may be caused by scanning lines (i.e., gate lines) and signal lines (i.e., source lines), line defects resulting from a short-circuit, point defects resulting from defective switching elements, non-uniform display or the like. Since the yield of the liquid crystal display devices is not 100%, sufficient inspection of the display quality must be conducted. Moreover, in order to improve the yield and display quality of the final liquid crystal display devices, the inspection result must be rapidly fed back to the production process. Therefore, it is important to conduct array inspection and/or operating-display inspection and analyze the inspection result. The term "array inspection" as used herein indicates inspecting the liquid crystal display device at the time the switching elements such as TFTs are completed. The term "operating-display inspection" as used herein indicates inspecting the liquid crystal display device before mounting expensive elements such as driver circuits, and TAB (Tape Automated Bonding), that is, inspecting the liquid crystal display panel by starting the display.

Figures 8A, 8B, 8C:
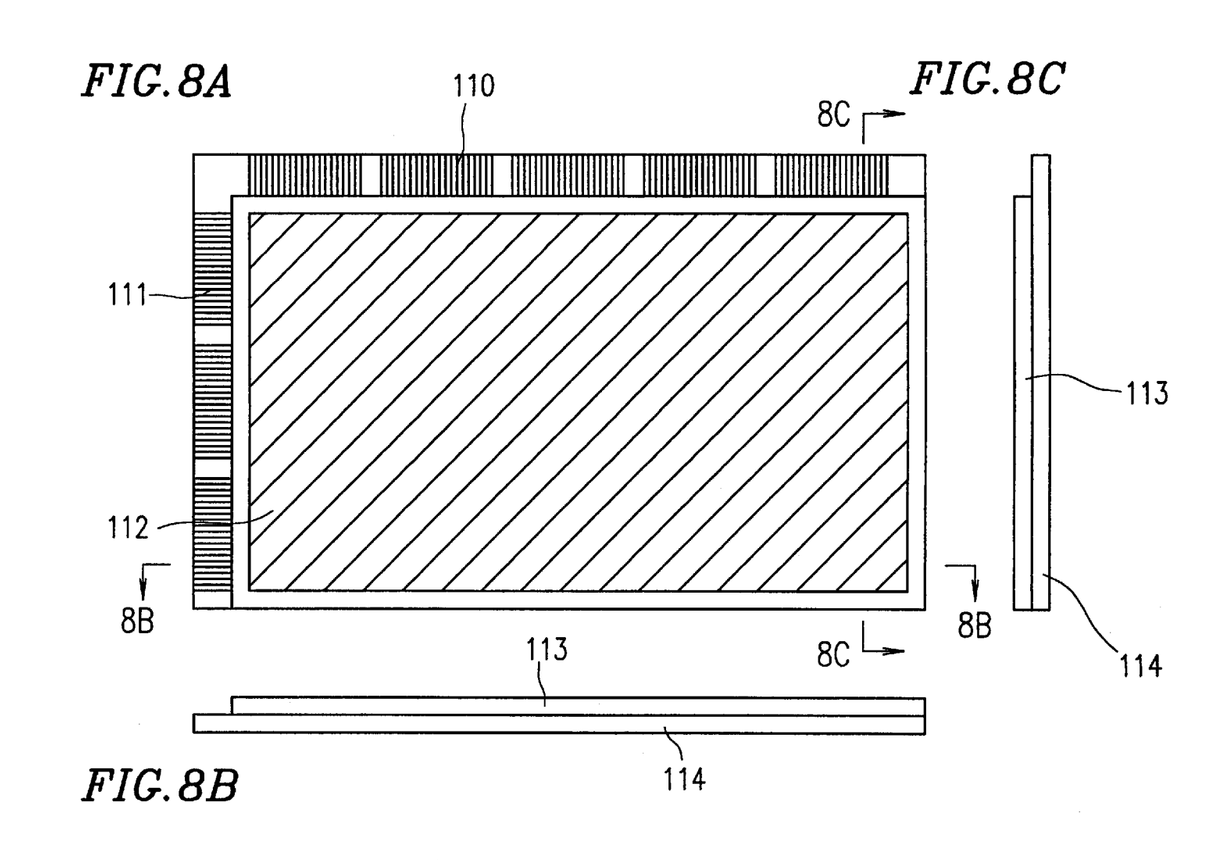
FIG. 8A is a plan view of an outer appearance of a conventional liquid crystal display device.
FIG. 8B is a front view of the conventional liquid crystal display device of FIG. 8A.
FIG. 8C is a side view of the conventional liquid crystal display device of FIG. 8A as viewed from the right side of the figure.

FIGS. 8A, 8B and 8C show a general liquid crystal display panel, wherein FIG. 8A is a plan view of the liquid crystal panel, FIG. 8B is a front view thereof, and FIG. 8C is a side view as viewed from the right side of the liquid crystal display panel.

The liquid crystal panel shown in FIGS. 8A, 8B and 8C includes a glass substrate (array substrate) 114 and a counter glass substrate 113 which faces the glass substrate 114, the glass substrate 114 and the counter glass substrate 113 being attached to each other with a liquid crystal material introduced therebetween. The glass substrate 114 includes pixel electrodes, active elements (i.e., switching elements), gate-bus lines, source-bus lines (not shown) and the like. In the outer periphery of the glass substrate 114, source-signal input terminals 110 and gate-signal input terminals 111 are provided as starting-signal input terminals. In the liquid crystal panel, image information is displayed on a display region 112.

A liquid crystal display device is mostly used in the products such as notebook personal computers. In such products, reduction in the total area of the elements in the outer periphery (i.e., peripheral region adjacent to the display region) of the liquid crystal panel has been desired in order to increase the display region 112 of the liquid crystal panel. Therefore, a method for inputting a signal from two sides of the panel, as shown in FIGS. 8A, 8B and 8C, is widely used. Moreover, the pitch of the input signal terminals 110 and 111 has been increasingly reduced in order to improve resolution.

The liquid crystal display panel having such a structure as described above is generally inspected as follows: a probe pin is put into contact with each of a multiplicity of signal input terminals of the liquid crystal display panel. Then, an inspection electric signal is applied thereto, whereby the liquid crystal panel is started. In this state, the liquid crystal panel is inspected and/or analyzed for defects with its operating patterns being changed. The inspection and/or analysis is conducted by visual recognition and/or by using a camera.

Figure 9:
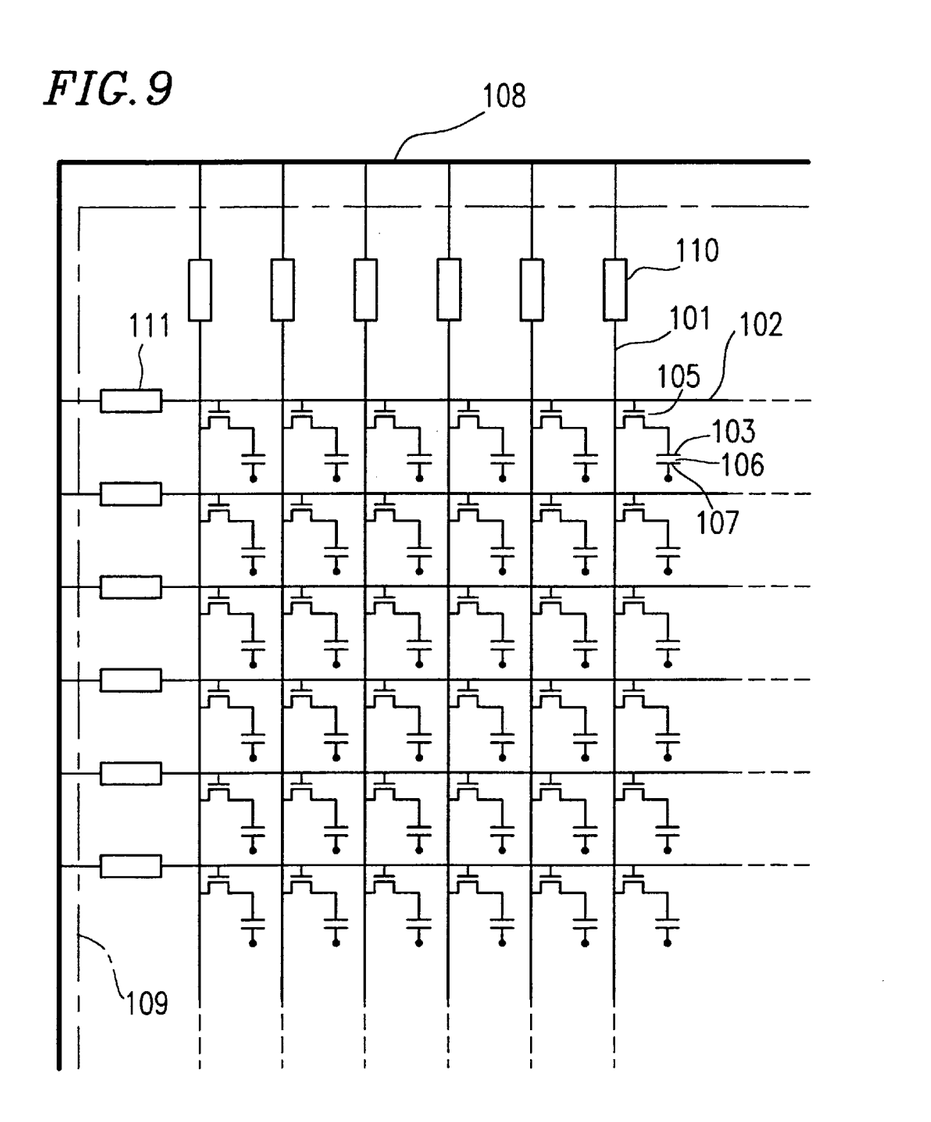
FIG. 9 is a schematic diagram of the circuitry in the conventional liquid crystal display device.

Such a conventional liquid crystal display device has the circuitry as shown in FIG. 9.

Source lines 101 and gate lines 102 are arranged in a matrix so as to cross each other with an insulating film (not shown) interposed therebetween. The signal input terminals 110 are provided on the respective extensions of the lines 101, and the signal input terminals 111 are provided on the respective extensions of the lines 102. The portions of the source and the gate lines 101, 102 in the peripheral region are referred to as the extensions of the respective lines 101 and 102.

In the case of the array inspection, a probe (not shown) is made in contact with each of the signal input terminals 110 and 111, and a signal voltage is applied thereto. When the liquid crystal panel is started as the liquid crystal display device, TAB or the like is bonded to the signal input terminals 110 and 111.

A TFT 105 is provided at every intersection of the source lines 101 and the gate lines 102, and the drain electrode of each TFT 105 applies a signal to a corresponding pixel electrode 103. Each pixel electrode 103 faces a corresponding counter electrode 107 with a liquid crystal layer 106 interposed therebetween, and holds a display data voltage in the liquid crystal layer 106, thereby displaying an image on the screen. Since the source lines 101 and the gate lines 102 are electrically insulated from each other by the insulating film, defects may be produced in the display due to static electricity. For example, the static electricity may be generated during the production process of the TFTs, the production and packaging processes of the liquid crystal panel and the like. In such a case, the static electricity thus generated charges the source lines 101 and/or the gate lines 102, whereby a voltage which is much higher than the actual driving voltage may be applied, causing dielectric breakdown of the insulating film and/or undesirable characteristics of the switching elements. In order to prevent such electrostatic damage, a short ring 108 for electrically short-circuiting the lines 101 and 102 is provided along the outer periphery of the liquid crystal display device. It should be noted that the two-dotted line 109 shown inside the short ring 108 represents a separation line.

Figure 10:
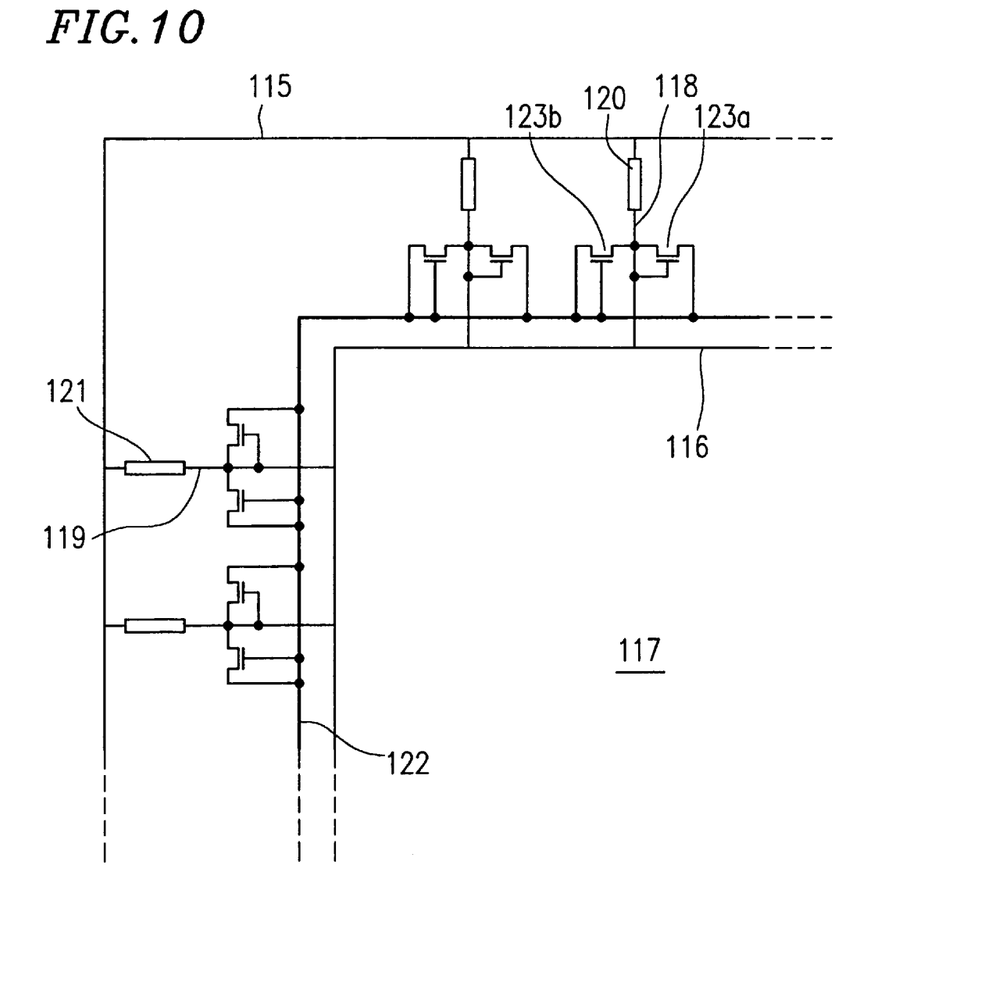
FIG. 10 is a schematic diagram of the circuitry in a terminal portion of another conventional liquid crystal display device.

Another structure as shown in FIG. 10 has also been proposed. This structure is disclosed in Japanese Laid-open Publication Nos. 63-220289 and 63-10558. FIG. 10 is a schematic enlarged view of a signal input terminal portion of a typical liquid crystal display device disclosed in Japanese Laid-open Publication Nos. 63-220289 and 63-10558.

Referring to FIG. 10, the liquid crystal display device includes an array substrate 115 and a counter substrate 116 which faces the array substrate 115, the array substrate 115 and the counter substrate 116 being attached to each other with a liquid crystal material being introduced therebetween. The array substrate includes display switching elements (not shown) such as TFTs. In the liquid crystal display device, image information is displayed on a display region 117. Source lines 118 and gate lines 119 are provided on the array substrate 115 as required for image display. Signal input terminals 120 are provided on the respective source lines 118, and signal input terminals 121 are provided on the respective gate lines 119. In order to prevent the above-mentioned electrostatic damage, a short ring 122 is provided in the outer periphery of the liquid crystal display device, and each of the lines 118 and 119 are electrically connected to the short ring 122 through 2-terminal operating a-Si (amorphous silicon) TFTs 123a and 123b or the like. The TFTs 123a and 123b are provided as diodes of opposite directions.

In the structure shown in FIG. 9, the short ring 108 is provided along the outer periphery of the liquid crystal display device and the lines 101 and 102 are directly electrically connected to the short ring 108. In this case, electrostatic damage can be prevented during the production process such as pattern formation. During the processes such as display inspection process and assembling process, however, a signal voltage must be individually input to each terminal. Therefore, it is necessary to cut off the short ring 108 by the separation line 109. Accordingly, the electrostatic damage cannot be prevented.

In the structure shown in FIG. 10, the a-Si TFTs 123a and 123b each serving as a protection element are provided between the short ring 122 and each of the lines 118 and 119. In this case, when the resistance of the protection elements is low, slight leakage occurs between the lines 118 and 119, causing disadvantages in the array inspection and the operating-display inspection. On the other hand, when the resistance of the protection elements is high, the electrostatic damage cannot be completely prevented. Accordingly, in the structure of FIG. 10, it is very difficult to optimize the resistance of the protection elements.

SUMMARY OF THE INVENTION

According to one aspect of the invention, a liquid crystal display device includes an array substrate; a counter substrate facing the array substrate; and a liquid crystal layer interposed between the array substrate and the counter substrate, wherein the array substrate includes: a plurality of pixel electrodes arranged in a matrix in a display region; a plurality of gate lines; a plurality of source lines which cross the plurality of gate lines; an insulating layer provided between the plurality of gate lines and the plurality of source lines; a plurality of switching elements respectively connected to respective ones of the plurality of the gate lines, the plurality of source lines, and the plurality of pixel electrodes; and a short ring, a plurality of first inspection signal voltage input terminals and a plurality of depletion-type thin film transistors (DTFT) provided in a peripheral region adjacent the display region, and wherein each of the plurality of gate lines and the plurality of source lines is connected to the short ring via respective ones of the plurality of first inspection signal voltage input terminals and respective ones of the plurality of depletion-type thin film transistors, and the plurality of depletion-type thin film transistors is located between the short ring and the plurality of first inspection signal voltage input terminals, the plurality of depletion-type thin film transistors control electrical conduction between the short ring and the plurality of gate lines and source lines.

In one example, each of the plurality of depletion-type thin film transistors has a DTFT source electrode electrically connected to corresponding ones of the plurality of gate lines and to corresponding ones of the plurality of source lines, and a DTFT gate electrode electrically connected to a DTFT gate voltage input line, a number of the at least one DTFT gate voltage input line being less than a number of the depletion-type thin film transistors, and a DTFT gate voltage is applied from a first DTFT gate voltage input terminal to all of the plurality of depletion-type thin film transistors through the at least one gate voltage input line.

In one example, each of the plurality of switching elements located in the display region is a reverse-stagger type thin film transistor, and each of the plurality of depletion-type thin film transistors is a stagger type thin film transistor.

In one example, a gate insulating film of each of the plurality of depletion-type thin film transistors is formed from a film which is identical to a protective insulating film of each of the reverse-stagger-type thin film transistors located in the display region.

According to another aspect of the invention, in a method for inspecting a liquid crystal display device, the liquid crystal display device is inspected by turning off the plurality of depletion-type thin film transistors, and inputting an inspection signal to the plurality of first inspection signal voltage input terminals.

In one example, each of the plurality of depletion-type thin film transistors which is connected to the respective ones of the plurality of source lines has a DTFT gate electrode electrically connected to a corresponding one of a plurality of DTFT gate voltage input lines, a plurality of DTFT gate voltage input terminals are provided in correspondence with the plurality of the DTFT gate voltage input lines, and a DTFT gate voltage is applied from each of the plurality of first DTFT gate voltage input terminals to the plurality of DTFT gate electrodes of corresponding ones of the plurality of depletion-type thin film transistors through a corresponding one of the plurality of DTFT gate voltage input lines.

In one example, DTFT source electrodes of the plurality of the depletion-type thin film transistors connected to each of the DTFT gate voltage input lines are electrically connected to a corresponding one of a plurality of branch lines of the short ring.

In one example, the plurality of branch lines of the short ring and a branch line of the short ring connected to a plurality of DTFT source electrodes of the depletion-type thin film transistors connected to corresponding ones of the plurality of gate lines are connected through a second DTFT to function as a single short ring when the second DTFT is in an ON state.

In one example, input terminals provided for the respective branch lines of the short ring, a second DTFT gate voltage input terminal for controlling a DTFT gate voltage of the second depletion-type thin film transistor, a third DTFT gate voltage input terminal for applying an identical voltage to the plurality of DTFT gate lines, and the first DTFT gate voltage input terminal function as a second inspection signal voltage input terminal, and the first inspection signal voltage input terminal and the second inspection signal voltage input terminal are located on different positions.

In one example, the number of the gate voltage input lines is a multiple of three so as to correspond to red, green and blue.

According still another aspect of the invention, in a method for inspecting a liquid crystal display device, array inspection is conducted using the first inspection signal voltage input terminal, and operating-display inspection is conducted using the second inspection signal voltage input terminal.

According to the present invention, the source lines and the gate lines are connected to the short ring through the depletion-type TFTs. Therefore, the electrostatic damage can be prevented by not applying a voltage to the gate electrodes (DTFT gate electrodes) of the depletion-type TFTs to render the depletion-type TFTs in an ON state (normal state). In the case where the DTFT gate electrodes of the depletion-type TFTs are arbitrarily collectively controlled, a DTFT gate voltage input terminal for applying a DTFT gate voltage to the corresponding DTFT gate electrodes is provided. As a result, the number of probes being put in contact with the DTFT gate voltage input terminal for applying a signal as well as the number of lines for TAB can be reduced.

In the case where the array inspection or the operating-display inspection is conducted, an OFF voltage is applied to the DTFT gate voltage input terminal, whereby electrically open state can be obtained between the source lines, between the gate lines and between the source and gate lines. Then, an inspection signal or a starting signal is applied to the input terminals of the liquid crystal display device. As a result, accurate array inspection and reliable operating-display inspection can be conducted.

According to the present invention, the source lines may be connected to a plurality of branch lines of a short ring (any number of branch lines may be provided). Branch lines of a short ring collectively function as a single short ring, which electrically short-circuit all gate lines and source lines. In this case, when the depletion-type TFTs are turned off, all of the input terminals and the lines are rendered in an electrically open state. Accordingly, an electric inspection method such as a method for measuring pixel charges can be conducted for the array inspection. In this case, the plurality of branch lines, which may be provided for the source lines, and a single branch line, which may be provided for the gate lines, may function as a single short ring. Moreover, input terminals provided for the plurality of branch lines for the short ring, a second DTFT gate voltage input terminal for controlling a DTFT gate voltage of the second depletion-type thin film transistor, a third DTFT gate voltage input terminal for applying an identical gate voltage to the plurality of DTFT gate lines, and the first DTFT gate voltage input terminal may function as a second inspection signal voltage input terminal, and the first inspection signal voltage input terminal and the second inspection signal voltage input terminal may be located on different positions. When the black display, for example, is inspected, the depletion-type TFTs are rendered in an ON state (or normal state), whereby an inspection starting signal voltage can be applied from the input terminals.

The source lines may be connected to a plurality of branch lines of the short ring according to a color (red, green and blue). In this case, the display of each color can be started by selectively applying a source signal voltage to the liquid crystal display device.

Thus, the invention described herein makes possible the advantages of providing (1) a liquid crystal display device capable of realizing accurate array inspection and reliable operating-display inspection while preventing electrostatic damage; and (2) a method for inspecting the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. The same reference numerals designate the same components.

EXAMPLE 1

Figure 1:
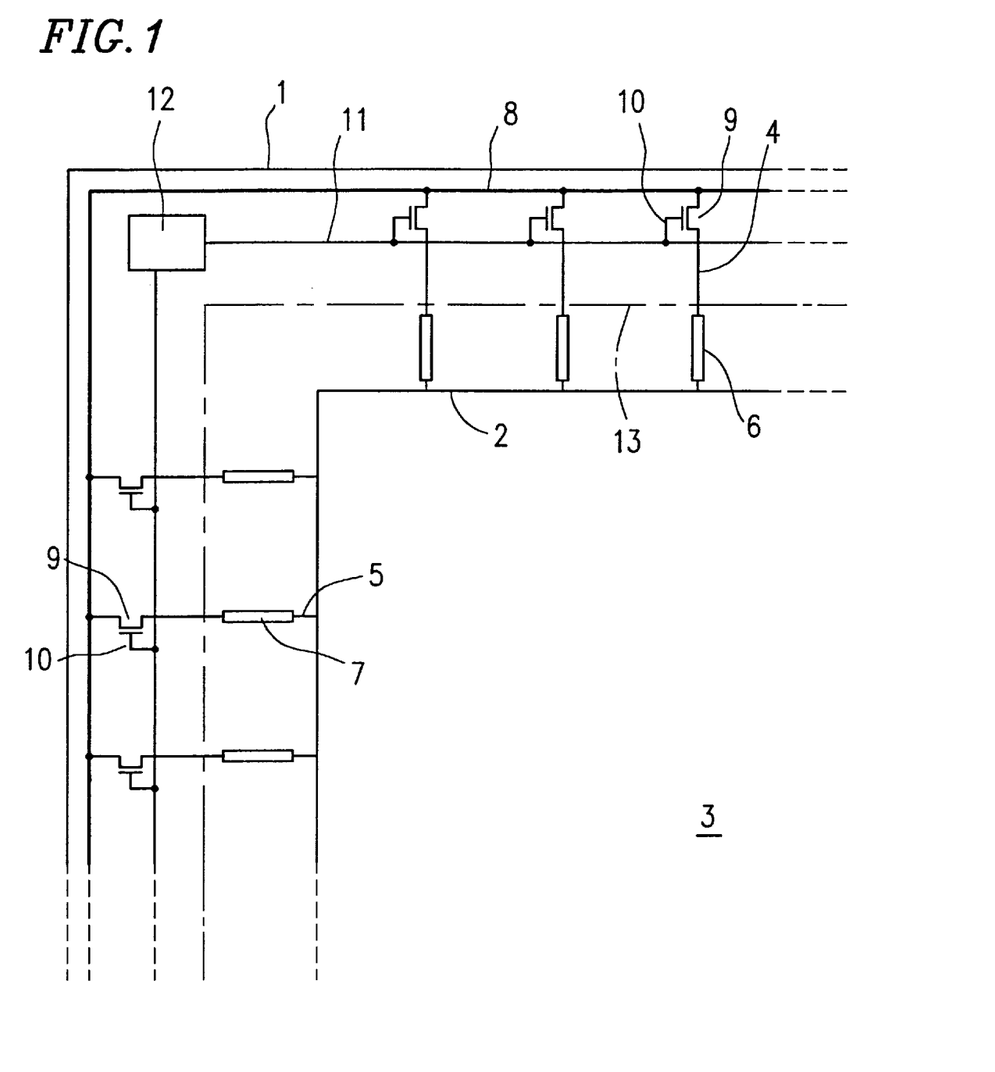
FIG. 1 is a schematic plan view of a signal input terminal portion of a liquid crystal display device according to Example 1 of the present invention.

FIG. 1 is a schematic enlarged view showing a signal input terminal portion of a liquid crystal display device according to Example 1 of the present invention.

The liquid crystal display device includes an array substrate 1 and a counter substrate 2 which faces the array substrate 1, the array substrate 1 and the counter substrate 2 being attached to each other with a liquid crystal layer being introduced therebetween. The array substrate 1 includes switching elements (not shown) such as TFTs. In the liquid crystal display device, image information is displayed on a display region 3. Source lines 4 and gate lines 5 are provided on the array substrate 1 as required for image display. Inspection signal input terminals 6 are provided on the respective source lines 4, and inspection signal input terminals 7 are provided on the respective gate lines 5. A short ring 8 formed from a low resistance metal is provided along the outer periphery of the array substrate 1. The lines 4 and 5 are electrically connected to the short ring 8 through respective depletion-type TFTs (DTFTs) 9. Each of the TFTs 9 may be either an n-channel TFT or a p-channel TFT. The gate electrodes 10 of the TFTs 9 (DTFT gate electrodes) are connected to a DTFT gate voltage input line 11, whereby all of the DTFT gate electrodes 10 of the TFTs 9 are collectively controlled by the DTFT gate voltage input terminal 12.

Figure 2:
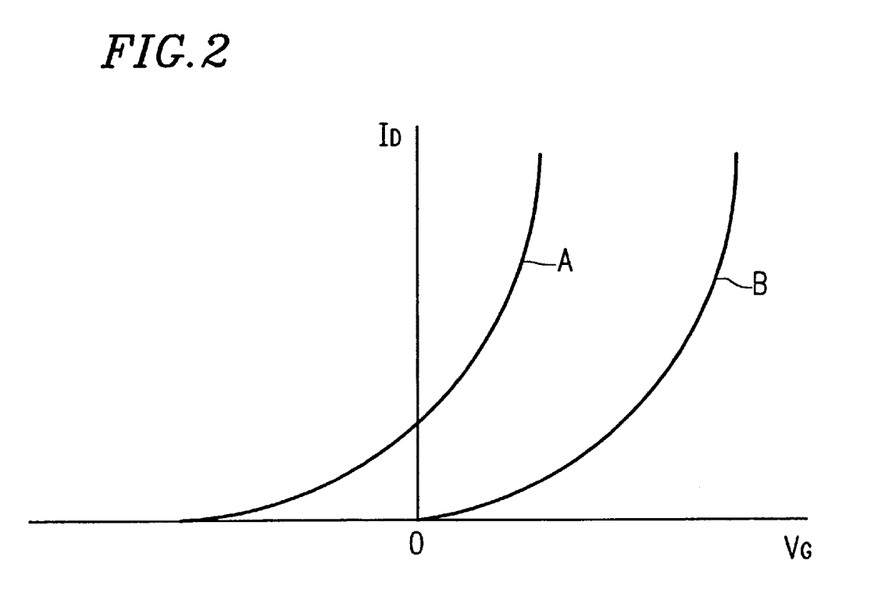
FIG. 2 is a graph showing switching characteristics of an n-channel depletion-type TFT provided in the liquid crystal display device of FIG. 1.

FIG. 2 is a graph showing switching characteristics of the TFT 9, wherein the abscissa indicates a gate voltage and the ordinate indicates a current flowing across the drain electrode. In this graph, the TFT 9 is an n-channel TFT. Curve B in the graph represents a characteristic of the TFT provided for a pixel electrode (corresponding to the pixel electrode 103 in FIG. 9). The TFT having the characteristic shown by curve B is generally referred to as an "enhancement-type" TFT. Curve A in the graph represents a characteristic of the "depletion-type" TFT 9 provided between the short ring 8 and each of the lines 4 and 5.

As can be seen from FIG. 2, a current flows in the depletion-type TFT 9 when a voltage is not applied to the gate electrode thereof. Therefore, by applying a negative voltage to the gate electrode of the depletion-type TFT 9, a current flowing across the drain electrode of the enhancement TFT provided for the pixel electrode, as shown by Curve B, can be cut off.

Hereinafter, methods for inspecting the liquid crystal display device of the present invention having the depletion-type TFTs 9 as protection elements will be described with reference to FIG. 1. More specifically, the array inspection method and the operating-display inspection method will be described.

During the production process of the liquid crystal display device, all of the source lines 4 and the gate lines 5 are connected through the respective depletion-type TFTs 9 to the short ring 8 which serves as a reference potential line. Therefore, when a voltage is not applied to the gate electrodes 10 of the TFTs 9, the electrostatic damage can be completely prevented.

In the case where the liquid crystal display device of the present invention is inspected either by the array inspection or the operating-display inspection, it is necessary to place an element such as a probe in contact with each of the inspection signal voltage input terminals 6 and 7 on the lines 4 and 5 and to separately apply either an inspection voltage or a starting signal voltage thereto. At this time, all of the lines 4 and 5 must be in an electrically open state. Therefore, an OFF voltage is applied from the DTFT gate voltage input terminal 12 to the gate electrodes of the TFTs 9. Thus, the lines 4 and 5 are completely in an open state, whereby accurate array inspection as well as reliable operating-display inspection can be achieved without being affected by, for example, a signal on an adjacent line. When the inspection is completed, voltage application to the DTFT gate voltage input terminal 12 is discontinued, whereby the electrostatic damage can be prevented.

In the case where the TFTs 9 serving as protection elements are not necessary after the inspection, the TFTs 9 need only be cut off by a separation line 13. In the case where the packaging process is conducted without cutting off the TFTs 9 or in the case where the liquid crystal display device is completed without cutting off the TFTs 9, an OFF voltage may be continuously applied to the DTFT gate voltage input terminal 12 by TAB or the like in order to prevent the electrostatic damage caused, for example, during the packaging process or during transportation of the liquid crystal display device.

According to Example 1, the depletion-type TFTs 9 are provided between the short ring 8 and the lines 5 and 6, whereby the electrostatic damage can be completely prevented during the production process. Moreover, an OFF voltage is applied to the TFTs 9 during the array inspection and the operating-display inspection, making all of the lines in an electrically open state. As a result, accurate array inspection as well as reliable operating-display inspection can be provided while completely preventing the electrostatic damage.

It should be noted that, by providing a common DTFT gate voltage input terminal 12 for collectively controlling an arbitrary number of gate electrodes 10 of the TFTs 9, the number of probes required for, for example, the inspection can be reduced. Such an example will be described later in Example 5.

EXAMPLE 2

Hereinafter, Example 2 of the present invention will be described. In Example 2, a phosphorus (P) layer is formed by diffusing phosphorus into an a-Si semiconductor film, and the phosphorus layer thus formed is used as an existing channel of each depletion-type TFT provided in a terminal portion.

Figure 3:
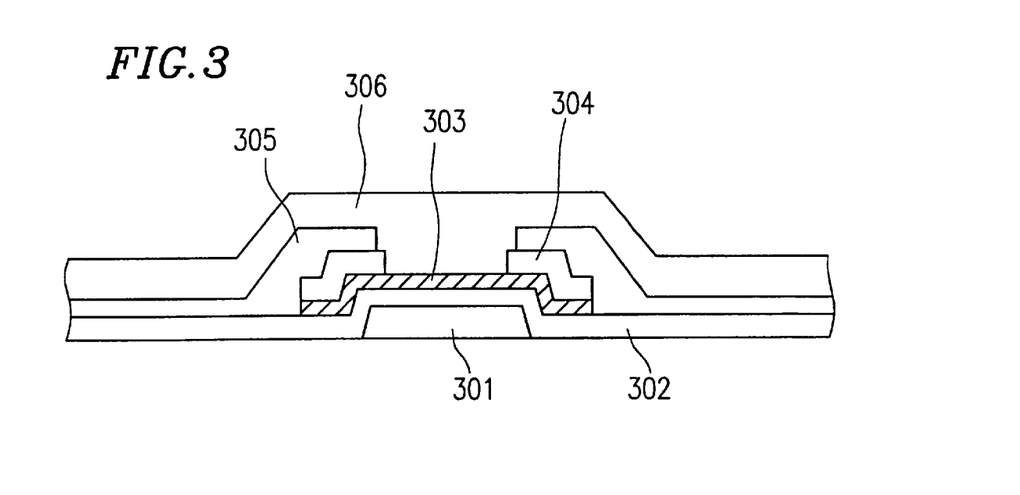
FIG. 3 is a cross sectional view of a TFT in a display region, which is formed according to production methods of Examples 2, 3 and 4 of the present invention.
Figure 4:
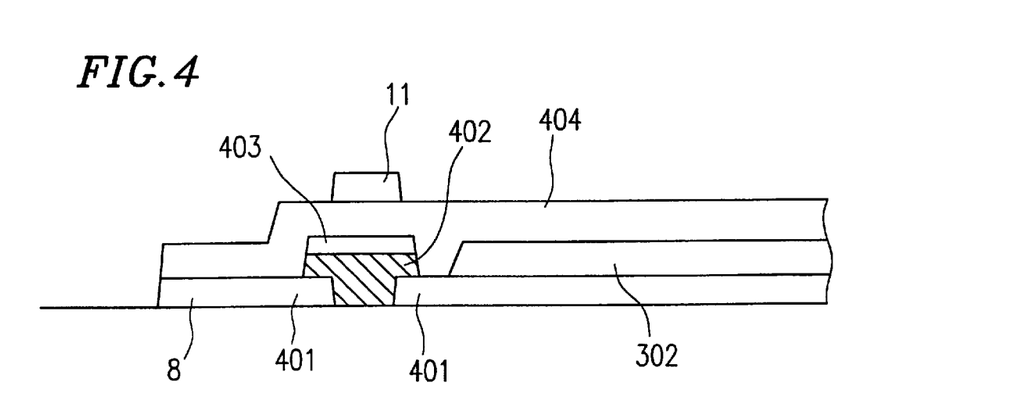
FIG. 4 is a cross sectional view of a TFT in a terminal portion, which is formed according to the production method of Example 2.

FIG. 3 shows a cross sectional view of a TFT provided in a display region according to Example 2, and FIG. 4 is a cross sectional view of a TFT provided in the terminal portion according to Example 2.

The TFT provided in the display region is an enhancement-type TFT in which a current does not flow when a gate voltage Vg=0. The TFT provided in the terminal portion is a depletion-type TFT in which a current flows when Vg=0. Therefore, the enhancement-type TFT provided in the display region has a threshold voltage Vt>0, whereas the depletion-type TFT provided in the terminal portion has Vt<0.

The production process of the TFT in the display region is closely related to the production process of the TFT in the terminal portion. Therefore, both production processes will now be described simultaneously.

Referring to FIG. 3, a gate electrode 301 of the TFT in the display region is first formed. The gate electrode 301 is formed from a metal such as Ta or Al with a thickness of about 3,000 Å. At this time, a short ring 8 is formed from the same material as that of the gate electrode, and the source and drain electrodes 401 of the TFT in the terminal portion as shown in FIG. 4 are formed simultaneously. The source and drain electrodes 401 of the TFT in the terminal portion may either be the same as or different from the material of the gate electrode of the TFT in the display region.

Next, a gate insulating film 302 with a thickness of about 3,000 Å is formed over the entire surface by a plasma chemical vapor deposition (CVD) method. The gate insulating film 302 is formed from an SiNx (silicon nitride) film. The gate insulating film 302 in the terminal portion is partially etched away as shown in FIG. 4.

Then, an a-Si semiconductor film and an n$^+$ a-Si semiconductor film are sequentially formed on the entire surface by a plasma CVD method. The a-Si semiconductor film has a thickness of about 200 Å, whereas the n+ a-Si semiconductor film has a thickness of about 500 Å. Thus, the a-Si semiconductor film 303 and the n+ a-Si semiconductor film 304 of the TFT in the display region as well as the a-Si semiconductor film 402 and the n+ a-Si semiconductor film (not shown; corresponding to the film 304 in FIG. 3) of the TFT in the terminal portion are simultaneously formed.

Thereafter, each of the a-Si semiconductor film 402 and the n+ a-Si semiconductor film of the TFT in the terminal portion and the a-Si semiconductor film 303 and the n+ a-Si semiconductor film 304 is etched into a prescribed pattern.

Then, only the TFT of the terminal portion is subjected to a laser annealing method. By the laser annealing method, phosphorus contained in the n+ a-Si semiconductor film (not shown; corresponding to the film 304 in FIG. 3) is diffused into an upper portion of the a-Si semiconductor film 402 located under the n+ a-Si semiconductor film. As a result, a surface layer 403 containing phosphorus is formed in the upper portion of the a-Si semiconductor film 402. In the laser annealing method, excimer laser (XeCl) having a wavelength of, for example, about 308 nm is used, and scanning is conducted with a laser beam being directed onto the TFT in the terminal portion, and more specifically, onto the surface of the n+ a-Si semiconductor film of the TFT in the terminal portion.

Thereafter, a portion of the n+ a-Si semiconductor film 304, which is located on the channel region (between the source and the drain) of the TFT in the display region shown in FIG. 3, is etched away by a dry etching method. At this time, the n+ a-Si semiconductor film of the TFT in the terminal portion of FIG. 4 is also simultaneously completely etched away. However, the phosphorus-containing surface layer 403 is not etched. The phosphorus-containing surface layer 403 functions as an existing channel layer of the depletion-type TFT in the terminal portion.

Thereafter, source and drain electrodes 305 of the TFT in the display region are formed.

Then, a protection film having a thickness of about 3,000 Å is deposited over the entire surface by a plasma CVD method. The protection film is formed from an SiNx film. The protection film 306 of the TFT in the display region serves as a protection film of the TFT in the display region. On the other hand, the protection film 404 of the TFT in the terminal portion serves as a gate insulating film of the TFT of the terminal portion because of its stagger structure.

Then, a line 11 is formed from a metal such as Al on the protection film 404. The line 11 corresponds to the gate electrode of the TFT in the terminal portion.

EXAMPLE 3

Figure 5:
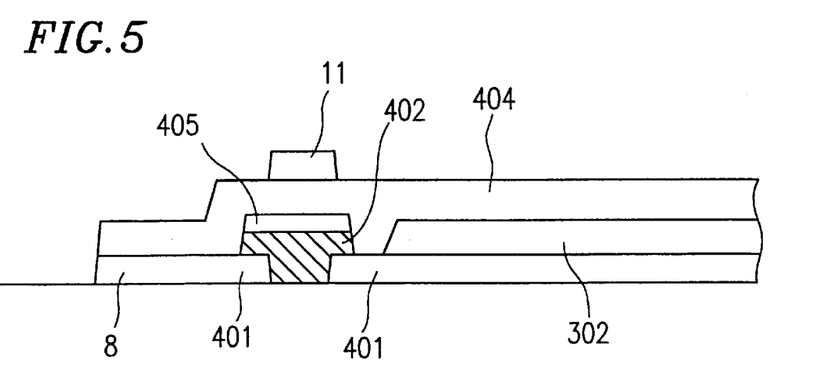
FIG. 5 is a cross sectional view of a TFT in a terminal portion, which is formed according to the production method of Example 3.

Hereinafter, Example 3 of the present invention will be described. FIG. 3 is a cross sectional view of a TFT provided in the display region according to Example 3, and FIG. 5 is a cross sectional view of a TFT provided in the terminal portion according to Example 3.

The TFT provided in the display region is an enhancement-type TFT in which a current does not flow when Vg=0. The TFT provided in the terminal portion is a depletion-type TFT in which a current flows when Vg=0. Therefore, the enhancement-type TFT provided in the display region has a threshold voltage Vt>0, whereas the depletion-type TFT provided in the terminal portion has Vt<0.

The production process of the TFT in the display region is closely related to the production process of the TFT in the terminal portion. Therefore, both production processes will now be described simultaneously.

In Example 3, a doped layer is formed by doping phosphorus (P) ions directly into a surface of an a-Si semiconductor film, and the doped layer thus formed is used as an existing channel of each depletion-type TFT provided in the terminal portion.

Referring to FIG. 3, a gate electrode 301 of the TFT in the display region is first formed. The gate electrode 301 is formed from a metal such as Ta or Al with a thickness of about 3,000 Å. At this time, a short ring 8 is formed from the same material as that of the gate electrode, and the source and drain electrodes 401 of the TFT in the terminal portion as shown in FIG. 5 are formed simultaneously. The source and drain electrodes 401 of the TFT in the terminal portion may either be the same as or different from the material of the gate electrode of the TFT in the display region.

Next, a gate insulating film 302 with a thickness of about 3,000 Å is formed over the entire substrate by a plasma CVD method. The gate insulating film 302 is formed from an SiNx film. The gate insulating film 302 in the terminal portion is partially etched away as shown in FIG. 5.

Then, an a-Si semiconductor film and an n+ a-Si semiconductor film are sequentially formed on the entire surface by a plasma CVD method. The a-Si semiconductor film has a thickness of about 200 Å, whereas the n+ a-Si semiconductor film has a thickness of about 500 Å. Thus, the a-Si semiconductor film 303 and the n+ a-Si semiconductor film 402 of the TFT in the display region as well as the a-Si semiconductor film 402 and the n+ a-Si semiconductor film (not shown; corresponding to the film 304 in FIG. 3) of the TFT in the terminal portion are simultaneously formed.

Thereafter, each of the a-Si semiconductor film 402 and the n+ a-Si semiconductor film of the TFT in the terminal portion and the a-Si semiconductor film 303 and the n+ a-Si semiconductor film 304 is etched into a prescribed pattern.

Thereafter, a portion of the n+ a-Si semiconductor film 304, which is located on the channel region (between the source and the drain) of the TFT in the display region shown in FIG. 3, is etched away by a dry etching method. At this time, the n+ a-Si semiconductor film of the TFT in the terminal portion of FIG. 5 is also simultaneously completely etched away.

Then, phosphorus (P) ions are doped only into a surface of the a-Si semiconductor film 402 of the TFT in the terminal portion. By the ion doping method, P ions are implanted into the TFT of the terminal portion, and more specifically, into the surface of the a-Si semiconductor film 402, whereby an ion-doped layer 405 is formed. At this time, phosphine (PH₃) is used as a doping gas. The ion-doped layer 405 functions as an existing channel layer of the depletion-type TFT in the terminal portion.

Thereafter, the source and drain electrodes 305 of the TFT in the display region are formed.

Then, a protection film having a thickness of about 3,000 Å is deposited over the entire surface by a plasma CVD method. The protection film is formed from an SiNx film. The protection film 306 of the TFT in the display region serves as a protection film of the TFT in the display region. On the other hand, the protection film 404 of the TFT in the terminal portion serves as a gate insulating film of the TFT of the terminal portion because of its stagger structure.

Then, a line 11 is formed from a metal such as Al on the protection film 404. The line 11 corresponds to the gate electrodes of the TFT in the terminal portion.

EXAMPLE 4

Figure 6:
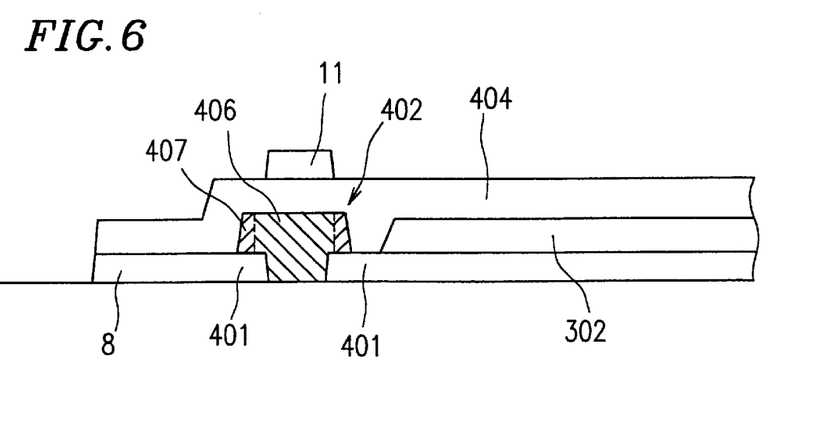
FIG. 6 is a cross sectional view of a TFT in a terminal portion, which is formed according to the production method of Example 4.

Hereinafter, Example 4 of the present invention will be described. FIG. 3 shows a cross sectional view of a TFT provided in the display region according to Example 4, and FIG. 6 is a cross sectional view of a TFT provided in the terminal portion according to Example 4.

The TFT provided in the display region is an enhancement-type TFT in which a current does not flow when Vg=0. The TFT provided in the terminal portion is a depletion-type TFT in which a current flows when Vg=0. Therefore, the enhancement-type TFT provided in the display region has Vt>0, whereas the depletion-type TFT provided in the terminal portion has Vt<0.

The production process of the TFT in the display region is closely related to the production process of the TFT in the terminal portion. Therefore, both production process will now be described simultaneously.

In Example 4, a doped layer is formed by doping phosphorus (P) ions through a gate insulating film after formation of the gate electrode, and the doped layer thus formed is used as an existing channel of the depletion-type TFT in the terminal portion.

Referring to FIG. 3, a gate electrode 301 of the TFT in the display region is first formed. The gate electrode 301 is formed from a metal such as Ta or Al with a thickness of about 3,000 Å. At this time, a short ring 8 is formed from the same material as that of the gate electrode, and the source and drain electrodes 401 of the TFT in the terminal portion as shown in FIG. 6 are formed simultaneously. The source and drain electrodes 401 of the TFT in the terminal portion may either be the same as or different from the material of the gate electrode of the TFT in the display region.

Next, a gate insulating film 302 with a thickness of about 3,000 Å is formed over the entire surface by a plasma CVD method. The gate insulating film 302 is formed from an SiNx film. The gate insulating film 302 in the terminal portion is partially etched away as shown in FIG. 6.

Then, an a-Si semiconductor film and an $n^+$ a-Si semiconductor film are sequentially formed on the entire surface by a plasma CVD method. The a-Si semiconductor film has a thickness of about 200 Å, whereas the $n^+$ a-Si semiconductor film has a thickness of about 500 Å. Thus, the a-Si semiconductor film 303 and the $n^+$ a-Si semiconductor film 304 of the TFT in the display region as well as the a-Si semiconductor film 402 and the $n^+$ a-Si semiconductor film (not shown; corresponding to the film 304 in FIG. 3) of the TFT in the terminal portion are simultaneously formed.

Thereafter, each of the a-Si semiconductor film 402 and the $n^+$ a-Si semiconductor film of the TFT in the terminal portion and the a-Si semiconductor film 303 and the $n^+$ a-Si semiconductor film 304 is etched into a prescribed pattern.

Then, a portion of the $n^+$ a-Si semiconductor film 304, which is located on the channel region (between the source and the drain) of the TFT in the display region shown in FIG. 3, is etched away by a dry etching method. At this time, the $n^+$ a-Si semiconductor film of the TFT in the terminal portion of FIG. 6 is also simultaneously completely etched away.

Thereafter, source and drain electrodes 305 of the TFT in the display region are formed.

Then, a protection film having a thickness of about 3,000 Å is deposited over the entire surface by a plasma CVD method. The protection film is formed from an SiNx film. The protection film 306 of the TFT in the display region serves as a protection film of the TFT in the display region.

On the other hand, the protection film 404 of the TFT in the terminal portion serves as a gate insulating film of the TFT of the terminal portion because of its stagger structure.

Then, a line 11 is formed from a metal such as Al on the protection film 404. The line 11 corresponds to the gate electrode of the TFT in the terminal portion.

Then, P ions are doped into the TFT in the terminal portion through the line (i.e, the gate electrode of the TFT in the terminal portion) 11. In the ion doping method, P ions are implanted into the TFT in the terminal portion, using the line 11 as a mask. At this time, phosphine ($PH_3$) is used as a doping gas. Moreover, the ion doping method is conducted with an acceleration voltage of about 10 to about 90 KV at room temperature. As a result, a portion of the a-Si semiconductor film 402, which is located under the line (i.e., the gate electrode of the TFT in the terminal portion) 11, is changed to an n-channel-forming region 406, whereas the remaining portion of the a-Si semiconductor film 402 forms the source and drain regions 407 as n-type impurity regions. The n-channel-forming region 406 forms an existing channel layer of the depletion-type TFT in the terminal portion.

EXAMPLE 5

Figure 7:
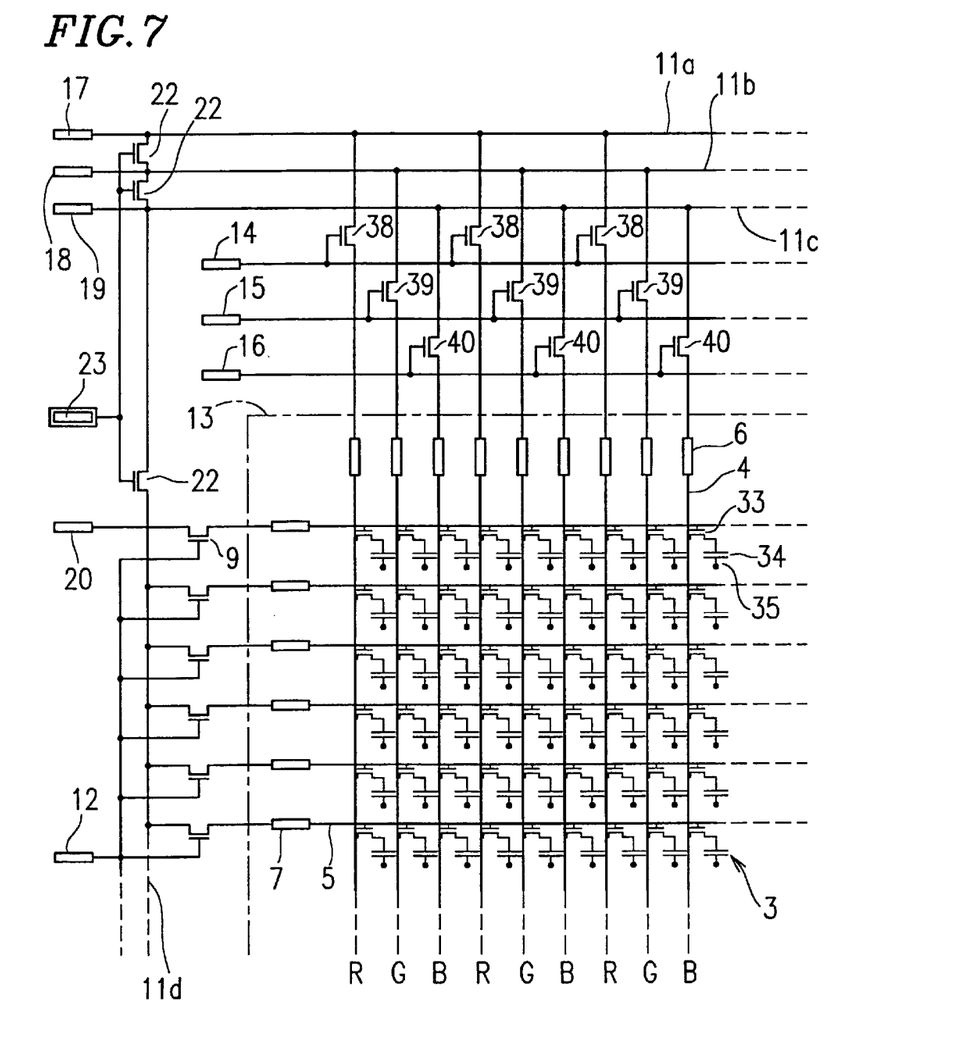
FIG. 7 is a schematic diagram of the circuitry in a liquid crystal display device according to Example 5.

Hereinafter, Example 5 of the present invention will be described. FIG. 7 is a schematic diagram showing a liquid crystal display device according to Example 5. An exemplary active-matrix liquid crystal display device including TFTs as switching elements is shown in Example 5.

In the liquid crystal display device of Example 5, source lines 4 and gate lines 5 intersect each other, and a TFT 33 is provided at every intersection of the source lines 4 and the gate lines 5. Each of the TFTs 33 is a switching element of a corresponding pixel for displaying image information. In the liquid crystal display device, counter electrodes 35 face respective pixel electrodes 34 with a liquid crystal layer interposed therebetween.

An array-inspection signal voltage input terminal 6 is provided on each of the extensions of the source lines 4, and an array-inspection signal voltage input terminal 7 is provided on each of the extensions of the gate lines 5. Furthermore, depletion-type TFTs 38, 39, 40 and 9 each serving as a switching element are provided on the extensions of the source lines 4 and the gate lines 5, as shown in FIG. 7. More specifically, the TFTs 38 are provided on the respective extensions of the source lines 4 which correspond to red (R) pixels. The TFTs 39 are provided on the respective extensions of the source lines 4 which correspond to green (G) pixels. The TFTs 40 are provided on the respective extensions of the source lines 4 which correspond to blue (B) pixels. The TFTs 9 are provided on the respective extensions of the gate lines 5.

All of the DTFT gate electrodes of the TFTs 9 on the gate lines 5 are connected to a DTFT gate voltage input terminal 12. Thus, an ON/OFF state of the TFTs 9 can be switched by applying a signal voltage to the DTFT gate voltage input terminal 12, as in the case of Example 1. Moreover, all of the DTFT source electrodes of the TFTs 9 are connected to a gate voltage input terminal 20. Thus, when the TFTs 9 are in an ON state, a gate signal voltage is applied to the TFTs 33 provided for each pixel in the display region.

All of the DTFT gate electrodes of the TFTs 38 are connected to a DTFT gate voltage input terminal 14. Therefore, an ON/OFF state of the TFTs 38 can be switched by applying a signal voltage to the DTFT gate voltage input terminal 14, as in the case of Example 1. Similarly, all of the DTFT gate electrodes of the TFTs 39 and the TFTs 40 are connected to DTFT gate voltage input terminals 15 and 16, respectively. Therefore, an ON/OFF state of the TFTs 39 and the TFTs 40 can be switched by applying a signal voltage to the DTFT gate voltage input terminal 15 and the DTFT gate voltage input terminal 16, respectively, as in the case of Example 1. Furthermore, all of the DTFT source electrodes of the TFTs 38, 39 and 40 are connected to source signal voltage input terminals 17, 18 and 19 through lines 11a, 11b and 11c, respectively. Therefore, when the TFTs 38 are in an ON state, a source signal voltage is applied through the line 11a to the corresponding TFTs 33 provided for the red pixels in the display region. Similarly, when the TFTs 39 and 40 are in an ON state, source signal voltages are applied through the lines 11b and 11c to the corresponding TFTs 33 provided for the green and blue pixels in the display region, respectively. It should be noted that each of the lines 11a, 11b, 11c and lid function as branch lines of a short ring, and the lines 11a, 11b, 11c and 11d together function as a single short ring.

Since most of the materials forming the liquid crystal display device are insulating materials, static electricity is accumulated during the production process and transportation of the liquid crystal display device. Consequently, the accumulated static electricity may be discharged within the liquid crystal display device, whereby an insulating film and the like may be damaged. Such damage causes short-circuit between the lines and/or change in characteristics of the switching elements, producing point and/or line defects. Accordingly, the image quality may be degraded. In order to prevent such electrostatic damage, the source lines 4 and the gate lines 5 must be short-circuited.

Therefore, all of the red source lines 4 are connected to the line 11a through the corresponding TFTs 38, as shown in FIG. 7. Similarly, all of the green and blue source lines 4 are connected to the lines 11b and 11c through the corresponding TFTs 39 and 40, respectively. The lines 11a, 11b, 11c and 11d are short-circuited by depletion-type TFTs 22.

When a voltage signal is not applied to a DTFT gate voltage input terminal 23 for controlling the TFTs 22, all of the lines 11a, 11b, 11c and 11d are in an electrically conductive state, thereby serving as a short ring. Accordingly, the source lines 4 and the gate lines 5 have the same potential, whereby the electrostatic damage can be prevented.

A method for supplying a signal voltage for the array inspection and the operating-display inspection will now be described with reference to FIG. 7.

For the array inspection, an electric inspection method such as a method for measuring pixel charges is generally used. In this method, a probe is made in contact with each of the inspection signal voltage input terminals 6 and 7 which are respectively provided on the extensions of the source lines 4 and the gate lines 5. In this case, an OFF voltage has been applied to the DTFT gate electrodes of the TFTs 38, 39, 40 and 9, whereby the TFTs 38, 39, 40 and 9 have been in an OFF state. Thus, each of the inspection signal voltage input terminals 6 and 7 is rendered in an electrically open state, whereby accurate array inspection can be achieved.

For the operating-display inspection, a method for inspecting an operating state of each of the red screen, the green screen, the blue screen and the black screen will now be described by way of illustration. In this method, in order to apply a signal voltage to the pixel electrodes 34 of the liquid crystal display device, the TFTs 33 within the display region 3 must be turned on. In order to turn on the TFTs 33, application of an OFF voltage to the gate voltage input terminal 12 is discontinued, thereby rendering the TFTs 9, i.e., the switching elements for a gate signal, in an ON state (normal state). Then, a gate signal voltage for the TFTs 33 is applied to the gate signal voltage input terminal 20. In the case of a normally-white-mode liquid crystal display device, when a voltage is applied to the pixel electrodes 34, the pixel electrodes 34 achieve the black display. On the other hand, when a voltage is not applied to the pixel electrodes 34, the pixel electrodes 34 achieve the display of their corresponding color (R, G or B) existing in the respective color filter.

Therefore, in order to obtain the red display, application of an OFF voltage to the DTFT gate voltage input terminals 15 and 16 is discontinued, thereby rendering the TFTs 39 and 40 in an ON state (normal state). Accordingly, the TFTs 33 corresponding to the TFTs 39 and 40 are turned on. Thereafter, an inspection source signal voltage for the ON-state TFTs 33 is applied to the input terminals 18 and 19, whereby the red display can be started. Thus, the red display can be inspected for the display quality such as point defects, line defects and non-uniform display. The blue, green and black displays can be similarly started and inspected for the display quality.

The red display may alternatively be started as follows: application of an OFF voltage to the DTFT gate voltage input terminals 14, 15 and 16 is discontinued, thereby rendering the TFTs 38, 39 and 40 in an ON state (normal state). Accordingly, all of the TFTs 33 are turned on. Thereafter, a low voltage is applied to the input terminal 17, whereas such a voltage that makes the display sufficiently dark is applied to the input terminals 18 and 19. Thus, the red display can be started. Moreover, the black display can be started as follows: application of an OFF voltage to the DTFT gate voltage input terminals 14, 15 and 16 is discontinued, thereby rendering the TFTs 38, 39 and 40 in an ON state (normal state). Accordingly, all of the TFTs 33 are turned on. Thereafter, such a voltage that makes the display sufficiently dark is applied to the input terminals 17, 18 and 19. Thus, the black display can be started. As described above, according to Example 5, the display of each color can be separately started and inspected for the display quality.

When the array inspection is conducted, an OFF voltage is applied to the DTFT gate voltage input terminals 23, 14, 15 and 16, thereby placing the lines 11a, 11b, 11c and lid serving as a short ring in an electrically open state. As a result, accurate inspection can be achieved. After the inspection is completed, application of the signal to the DTFT gate voltage input terminal 23 is discontinued, whereby the electrostatic damage can be prevented.

In the conventional examples, about 3,000 probes are required for a display having SVGA (Super Video Graphics Array) resolution. According to the operating-display inspection of Example 5, however, only five probes need be made in contact with the respective input terminals 17, 18, 19, 20 and 23 in order to apply a gate signal voltage and a source signal voltage. As a result, the number of probes can be significantly reduced. After the operating-display inspection is completed, the portion where the inspection signal input terminals are located is cut off along the separation line 13, and thereafter, the components are mounted.

In the case of the array inspection of Example 5, an expensive probe corresponding to every signal input terminal must be provided due to the principle of the inspection. In the case of the operating-display inspection, however, inspection can be conducted by using a simple contact method without using such an expensive probe. Thus, the array inspection and the operating-display inspection can be realized with a reduction in cost.

It should be noted that, although the normally-white-mode liquid crystal display device has been described in Example 5, the present invention is not limited to this. A normally-black-mode liquid crystal display device can also be inspected according to the present invention. In the case where the normally-black-mode liquid crystal display device is inspected, a signal voltage applied is reversed with respect to the case of the normally white-mode liquid crystal device.

Instead of the TFTs 38, 39, 40 and 9, elements such as diodes may be used as switching elements. Although the TFTs 38, 39, 40 and 9 are depletion-type TFTs in Example 5, other types of TFTs may alternatively be used in the present invention. In such a case, however, in order to prevent the electrostatic damage, it is necessary to apply, for example, an ON voltage to the switching elements and render the gates of the switching elements in an ON state so that the switching elements can be short-circuited between the short rings and the source and gate lines.

According to Example 5, the source lines are classified into three colors (red, green and blue), so that the red, green and blue displays can be separately started. Accordingly, a signal voltage can be separately applied to the source lines of each color. In the case where only the black display need be inspected, only one switching element for a signal input is provided.

According to Example 5, three lines 11a, 11b and 11c serving as a short ring are provided. However, the present invention is not limited to this. The number of lines may be a multiple of 3 so as to correspond to red, blue and green.

As has been described in detail, according to the present invention, the depletion-type TFTs are provided between the short ring and each of the source lines and the gate lines, whereby the electrostatic damage can be completely prevented during the production process. Moreover, by appropriately controlling the TFTs in the terminal portion, accurate array inspection as well as reliable operating-display inspection can be conducted while completely preventing the electrostatic damage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
    an array substrate;
    a counter substrate facing the array substrate; and
    a liquid crystal layer interposed between the array substrate and the counter substrate, the array substrate comprising:
    a plurality of pixel electrodes arranged in a matrix in a display region;
    a plurality of gate lines;
    a plurality of source lines which cross the plurality of gate lines;
    an insulating layer provided between the plurality of gate lines and the plurality of source lines;
    a plurality of switching elements respectively connected to respective ones of the plurality of the gate lines, the plurality of source lines, and the plurality of pixel electrodes; and
    a short ring comprising a plurality of branch lines, a plurality of first inspection signal voltage input terminals and a plurality of depletion-type thin film transistors (DTFTs) provided in a peripheral region adjacent the display region,
    wherein each of the plurality of gate lines and source lines is connected to the short ring via respective ones of the plurality of first inspection signal voltage input terminals and respective ones of the plurality of DTFTs, the plurality of DTFTs are located between the short ring and the plurality of first inspection signal voltage input terminals, and control electrical conduction between the short ring and the plurality of gate lines and source lines, and
    DTFT source electrodes of the plurality of DTFTs connected to each of a plurality of DTFT gate voltage input lines are electrically connected to a corresponding one of the plurality of branch lines.

2. A liquid crystal display device according to claim 1, wherein each of the plurality of DTFTs has a DTFT gate electrode electrically connected to at least one of the plurality of DTFT gate voltage input lines,
    a number of the at least one of the plurality of DTFT gate voltage input lines being less than a number of the plurality of DTFTs, and
    a DTFT gate voltage is applied from a first DTFT gate voltage input terminal to all of the plurality of DTFTs through the at least one of the plurality of gate voltage input lines.

3. A liquid crystal display device according to claim 1, wherein each of the plurality of switching elements located in the display region is a reverse-stagger type thin film transistor, and
    each of the plurality of DTFTs is a stagger type thin film transistor.

4. A liquid crystal display device according to claim 3, wherein a gate insulating film of each of the plurality of DTFTs is formed from a film which is identical to a protective insulating film of each of the reverse-stagger-type thin film transistors located in the display region.

5. A liquid crystal display device according to claim 1, wherein each of the plurality of DTFTs which is connected to the respective ones of the plurality of source lines has a DTFT gate electrode electrically connected to a corresponding one of the plurality of DTFT gate voltage input lines, a plurality of DTFT gate voltage input terminals are provided in correspondence with the plurality of the DTFT gate voltage input lines, and
    a DTFT gate voltage is applied from each of the plurality of DTFT gate voltage input terminals to the DTFT gate electrodes of corresponding ones of the plurality of DTFTs through a corresponding one of the plurality of DTFT gate voltage input lines.

6. A liquid crystal display device according to claim 5, wherein the plurality of branch lines and one of the plurality of branch lines connected to the DTFT source electrodes of corresponding ones of the plurality of DTFTs connected to corresponding ones of the plurality of gate lines are connected through a second DTFT to function as a single short ring when the second DTFT is in an ON state.

7. A liquid crystal display device according to claim 6, wherein input terminals provided for the plurality of branch lines, a second DTFT gate voltage input terminal for controlling a DTFT gate voltage of the second DTFT, a third DTFT gate voltage input terminal for applying an identical voltage to the plurality of DTFT gate voltage input lines, and a first DTFT gate voltage input terminal function as a plurality of second inspection signal voltage input terminals, and
    the plurality of first inspection signal voltage input terminals and the plurality of second inspection signal voltage input terminals are located at different positions.

8. A liquid crystal display device according to claim 5, wherein a number of the plurality of gate voltage input lines is a multiple of three so as to correspond to red, green and blue.

* * * * *